United States Patent
Gimenez

[15] 3,656,928
[45] Apr. 18, 1972

[54] PROCESS FOR CONTINUOUSLY INCORPORATING MODIFIERS INTO MOLTEN GLASS

[72] Inventor: German Artigas Gimenez, Aviles, Spain
[73] Assignee: Saint-Gobain, Neuilly-sur-Seine, France
[22] Filed: Feb. 24, 1970
[21] Appl. No.: 13,386

[30] Foreign Application Priority Data
Feb. 21, 1969 France..............................6904440

[52] U.S. Cl....................................65/121, 65/134, 65/135, 65/337, 65/335
[51] Int. Cl.........................................C03b 5/26, C03b 5/16
[58] Field of Search........................................65/121, 60, 134

[56] References Cited
UNITED STATES PATENTS

| | | | |
|---|---|---|---|
| 2,268,247 | 12/1941 | Fox | 65/60 X |
| 3,343,935 | 9/1967 | Keefer et al | 65/134 X |
| 2,244,468 | 6/1941 | Lytle | 65/60 X |
| 3,443,921 | 5/1969 | Boivent | 65/134 |
| 1,698,491 | 1/1929 | Brasseur et al | 65/184 X |
| 1,734,964 | 11/1929 | Danner | 65/121 X |
| 3,271,125 | 9/1966 | Lipp | 65/121 X |
| 3,479,167 | 11/1969 | Ashman | 65/134 X |
| 3,523,778 | 8/1970 | Robinson | 65/121 X |

Primary Examiner—Frank W. Miga
Attorney—Dale A. Bauer, John L. Seymour and Bauer & Seymour

[57] ABSTRACT

Solid particulate material such as colorant to be added to and homogenized with molten glass in a melting furnace, is deposited into a reservoir over and subjected to the hot atmosphere of the furnace and thereby melted. The molten material or additive flows continuously from the reservoir in a plurality of small filaments which fall onto a smooth inclined planar surface of heat resistant material dipping into the molten glass. On the planar surface the filaments spread out into a smoothly and downwardly flowing stream of uniform minute thickness which passes into the molten glass without turbulence and without entrainment of air bubbles. If required, additional heating means for the solid particulate additive or frit, may be provided.

5 Claims, 5 Drawing Figures

INVENTOR
German Artigas Gimenez
BY Bauer and Seymour
ATTORNEYS

INVENTOR
German Artigas Gimenez
BY Bauer and Seymour
ATTORNEYS

PROCESS FOR CONTINUOUSLY INCORPORATING MODIFIERS INTO MOLTEN GLASS

This invention relates to a method of and an apparatus for the continuous feeding into molten glass within a glass-melting furnace, of additives for the modification and/or treatment of the physical or chemical properties of the final product. As an example is cited colorant and like materials in the form of frit.

The introduction of materials such as colorants, into the molten glass of commercial type glass-making furnaces and similar apparatus is usually effected by channeled distributors or feeders connected to feed the material into the melting furnace at a controlled rate. Such furnaces are of large capacity. The procedure enables the continuous production of glass of certain desired or unique characteristics or qualities enabling the glass being produced to be modified as by coloration, and formed into articles of fined glass, but without effect upon the actual physical composition or nature of the amorphous glass itself.

The introduction into molten glass, of additives as mentioned in the preceding paragraphs, presents unique problems when such additives are in solid or unmelted condition and must be rapidly mixed and homogenized with the molten glass existing in the furnace. Such additives may, for instance, be in the form of minute particles of pulverized solid glass and commonly known as frit. The additives are highly concentrated in and with respect to the actual characteristics to be imparted to the glass. When frit is thus added to the glass it forms heterogeneous strings or fillets which can be intimately blended and homogenized with the molten glass, only with great difficulty. Further, additives added in the manner under discussion, unavoidably introduce air bubbles into the glass.

To remedy the problems as set forth in the immediately foregoing paragraphs it has been proposed to assure a better and more rapid mixing of the additives with the molten glass, to melt them in an auxiliary furnace just prior to their introduction into the molten glass in the melting tank or furnace. While this procedure operates satisfactorily, it calls for an auxiliary furnace provided with its own independent heating means. Such auxiliary equipment is expensive, wasteful of heat, and adds materially to the cost per unit weight of the final product.

Further the fillets or strings of molten frit which pass directly into the molten glass, undesirably introduce air bubbles which are difficult to eliminate and, if not eliminated, created voids which detract from the appearance and value of the finished product.

The present invention has for its chief object and purpose the provision of a method and an apparatus for overcoming and obviating the aforesaid problems, in a simple, sure and inexpensive way.

It is a further object to provide a method and apparatus as aforesaid, wherein the additive ultimately homogenized with the molten glass in the melting furnace, is first deposited in solid particulate form, into a reservoir subjected to the heat emanating from the walls, the reheating burners, the gas in the feeders, and mass of intensely hot glass in the furnace, is melted in the reservoir and smoothly flowed into the glass in a continuous ribbon or stream of minute thickness.

Yet another object is to provide apparatus by which the molten additive or frit is formed into a ribbon or stream, and introduced into the glass without turbulence and without the entrainment of air bubbles into the glass.

Still another object is to provide a method and apparatus by which additives may be melted, introduced into and homogenized with the molten glass in a melting furnace, efficiently, inexpensively, without the necessity for separate and independent heating means for the frit.

Other objects and advantages of the invention will be obvious to those skilled in the art, after a study of the following detailed description, in connection with the accompanying drawing.

Figures 1, 3, 4:
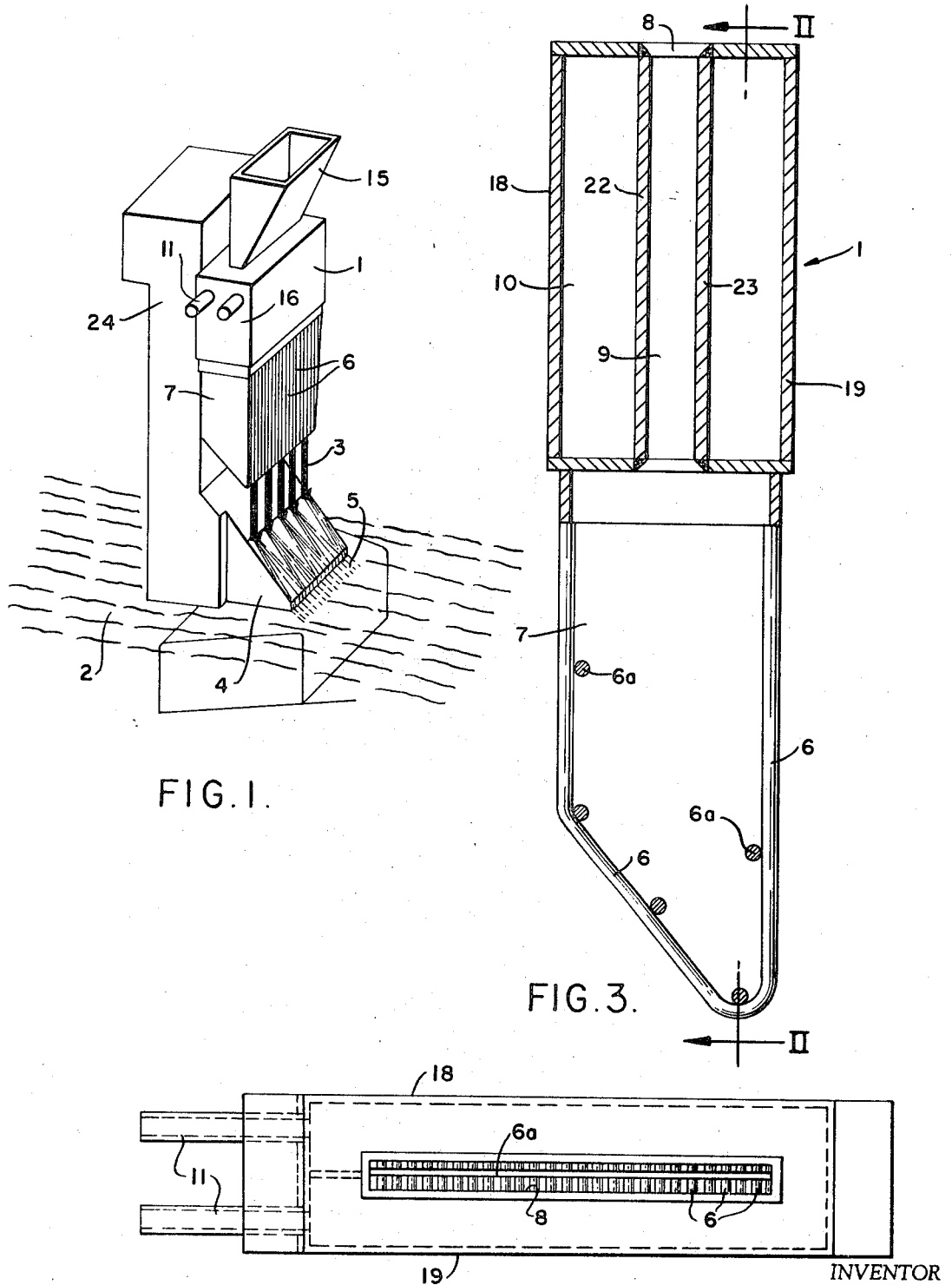
FIG. 1 is a schematic perspective view of apparatus embodying the invention.
FIG. 3 is a section to about the same scale as FIG. 2, taken in a plane identified by line III—III, FIG. 2.
FIG. 4 is a plan view.

Referring to FIG. 1, a reservoir or container 1 for frit is mounted by supporting means 24, over a mass of molten glass 2 in the melting furnace or tank. The reservoir comprises a central vertical chamber 9, FIG. 3, supplied with frit deposited into a hopper 15, FIG. 1. The reservoir includes end walls 16, 17, FIG. 2, back and front walls 18, 19, FIG. 3, and inner walls such as 20, 21, 22 and 23, spaced inwardly from, and parallel with walls 16, 17, 18 and 19 respectively and forming therewith a jacket for coolant supplied and exhausted by pipes 11, FIGS. 1, 2 and 4.

The bottom of chamber 9 is open so that frit or like additive may flow gravitationally into a grill between laterally-spaced end walls 7. The grill is formed by laterally-spaced, parallel, vertical bars 6 of heat resistant metal, rigidly united and interconnected in uniformly-spaced relation by cross bars 6a. The spacing between bars is small so that the fusing solid particles of frit or like material cannot pass through the interstices.

Thus, as the particulate additive gravitates downwardly from chamber 9 into the space defined by the grill, it is subject to the intense heat of the atmosphere above the mass of glass 2 in the melting furnace, and thereby liquified. The melted additive flows downwardly from the grill, in the form of a plurality of streams or filaments 3, FIG. 1, and drops onto the smooth, downwardly and forwardly inclined planar surface of an abutment 4 of heat resistant metal. From FIGS. 1 and 5 it is noted that the abutment surface has a lower lip slightly immersed below the level of the molten glass 2.

On striking the planar surface of abutment 4 the filaments of molten additive spread out thereon, into a thin smooth sheet of downwardly flowing liquid which passes without turbulence and without entrainment of gas bubbles, into the mass of molten glass where it mixes and homogenizes rapidly therewith.

Figures 2, 5:
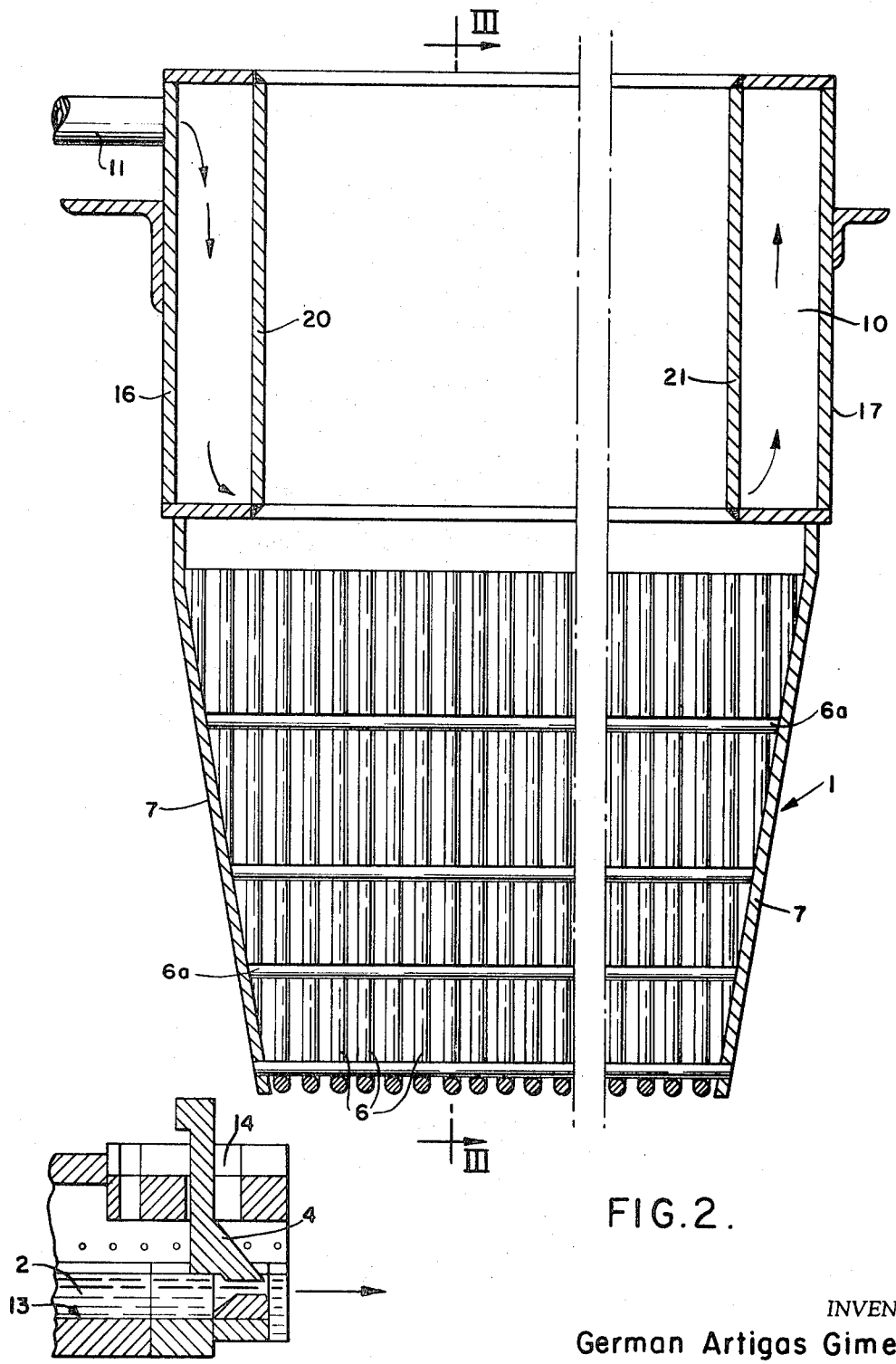
FIG. 2 is a sectional elevation to a greatly enlarged scale, taken in a plane identified by line II—II, FIG. 3.
FIG. 5 is an illustration of that portion of the apparatus by which molten additives are introduced into the surface of molten glass in the melting furnace, taken in a vertical, longitudinal plane.

Referring to FIG. 5, abutment 4 may be made vertically adjustable so that it may be releasably secured in position to vary the depth to which its lower lip is immersed below the level or surface of molten glass mass 2.

While the apparatus shown is particularly useful for the addition of colorants or frits into the glass, it is also useful for the adding of other materials commonly introduced into glass to alter its physical and/or chemical properties.

Having fully disclosed the invention, what I claim and desire to secure by Letters Patent is:

1. A method of melting particulate material and of distributing the melt uniformly throughout a width of a stream of molten glass flowing along a glass melting furnace which comprises forming a column of the particulate material within the furnace above the surface of the molten glass in a location such that the column is exposed to the hot gases and radiant heat of the furnace, the length of the column being such that the particulate material melts in the heat of the furnace before it reaches the surface of the glass, forming the molten material into a thin ribbon progressing toward the surface of the bath, supporting the molten ribbon on a hot surface as it approaches the bath, and introducing the hot, molten ribbon into the moving stream of glass.

2. A method according to claim 1 in which the column of particulate material is of elongated, substantially rectangular shape in cross section, and a long face of the rectangle is divided into a multiplicity of equal sized, arcuate segments, and the hot gases of the furnace enter into the segments.

3. A method according to claim 1 in which the particulate material is coloring matter for the glass.

4. A method according to claim 1 which comprises cooling the upper part of the circumference of the column of particulate material.

5. A method of uniformly adding a melt to a stream of molten flowing glass which comprises introducing the ingredients of the melt in solid particulate form within the furnace containing the flowing stream, melting said ingredients by the heat of the furnace, dividing the melt into streams of equal dimensions flowing toward the molten glass, transforming the streams of equal dimensions into a ribbon of minute thickness, flowing the ribbon along a course diagonally approaching the surface of the glass, and joining the ribbon and the stream of molten flowing glass.

* * * * *